United States Patent
Suzuki et al.

(10) Patent No.: US 6,294,605 B1
(45) Date of Patent: Sep. 25, 2001

(54) SLURRY COMPOSITION FOR REINFORCING CONCRETE STRUCTURE

(75) Inventors: Masaomi Suzuki; Sotai Suzuki, both of Numazu (JP)

(73) Assignee: Kabushiki Gaisha Esugii, Tokyo-to (JP)

( * ) Notice: Subject to any disclaimer, the term of this patent is extended or adjusted under 35 U.S.C. 154(b) by 0 days.

(21) Appl. No.: 09/665,162

(22) Filed: Sep. 19, 2000

(51) Int. Cl.$^7$ .............................. C08K 3/40; B05D 7/00
(52) U.S. Cl. ........................................ 524/494; 427/407.3
(58) Field of Search ........................ 524/494; 427/407.3

(56) References Cited

U.S. PATENT DOCUMENTS 4,681,802 * 7/1987 Gaa et al. .
4,810,576 * 3/1989 Gaa et al. .
5,916,392 * 6/1999 Granbari .

* cited by examiner

Primary Examiner—Tae H. Yoon
(74) Attorney, Agent, or Firm—Oblon, Spivak, McClelland, Maier & Neustadt, P.C.

(57) ABSTRACT

A slurry composition for mending a deteriorated surface of a concrete structure. The slurry includes an acrylic emulsion type elastic paint suspended by glass fibers cut from glass fiber strands. Prior to the formation of the slurry, the chopped glass fiber strands are immersed to a suitable solvent such as a toluene so that any size (spinning oil) applied to the filaments during their spinning operation are removed. The slurry is applied to the deteriorated surface of a concrete structure so that a reinforcing coating is created on the surface of the concrete structure.

16 Claims, 3 Drawing Sheets

SLURRY COMPOSITION FOR REINFORCING CONCRETE STRUCTURE

BACKGROUND OF THE INVENTION

1. Field of the Invention

The present invention relates to a slurry composition for a reinforcement purpose, which can be suitably used for producing a strengthened object and for strengthening and/or repairing a concrete building.

2. Description of Related Art

A coating with paint on an outer surface of a concrete building is not only for obtaining an aesthetic appearance but also for preventing water from entering into the interior of the concrete structure. Namely, the concrete structure is, itself, not so sufficiently protected against the invasion by the water, which causes the concrete structure to be likely intruded by the water, thereby prematurely degrading the concrete structure. In a situation that any cracks existing on the surface of the concrete structure are located, an injection of a plastic material into the crack is done, which is followed by a coating of the concrete surface with a paint. As a result, any chance of an intrusion of the water into the concrete structure is as less as likely. However, it is actually inevitable that, in accordance with an elapse of time, a degradation of the surface of the concrete structure is proceeded, which causes the latter to be highly entered by rainwater. In this case, alkali components in the concrete structure are flown out, which makes, on one hand, the concrete structure to be fragile and, on the other hand, the inner reinforcing steel members to be corroded and to be swelled, thereby causing the concrete structure to be broken, resulting in a danger that parts of the concrete structure are separated and dropped.

In view of the above, a repairing work will be essential in a situation that a concrete structure becomes old so that it has portions which may easily be broken and separated. A mending of such a deteriorated concrete structure is, conventionally, executed such that the portions of the concrete structure where the separation is likely are subjected to a scraping, and a mending by using a mortal is done. As to defects of a large size in the concrete structure, anchor members are implanted to the concrete structure, with which reinforcing steel members are connected, on which assembly a mending by using a mortal is done.

The portions of the concrete structure, which are, even once, separated are neutralized due to the fact that the alkali components are flown out by rainwater, which causes the concrete structure to be less adhesive to the mortal. As a result, irrespective of the provision of the implanted anchor members, a further progress in the deterioration of the concrete structure is more likely.

SUMMARY OF THE INVENTION

An object of the present invention is to provide a innovation for overcoming the above mentioned difficulties in the prior art.

Another object of the present invention is to provide a slurry composition capable of mending, in a idealized manner, a deteriorated concrete structure.

In order to attain the above mentioned objects, the present invention is based on the inventor's discovery that glass fibers have, under individually separated condition, an increased affinity with respect to various kinds of base materials, thereby attaining an increased reinforcing function under a solidified state. Namely, a reinforcing by glass fibers is per se conventional in a field such as a fiber reinforced plastic (FRP). Namely, in a conventional technique, a spinning of a bundle of glass fiber filaments (glass fiber strands) is done while applying thereto a chemical composition (size) containing a high polymer, oil and various emulsifier. During the spinning of the glass fiber filaments, the thickness of the single glass fiber filament is as fine as utmost about 9 $\mu$m. Thus, an individual winding of such a fine filament is impossible. At a result, the filaments of a number as large as several hundreds to several thousand are combined to a strand by applying a size to the filaments. The glass fiber strands are woven to a glass fiber fabric or are subjected to a cutting to obtain glass fiber chips. These glass fiber clothes or chips are used in the reinforced structure. For example, in case of a FRP ship, these grass fiber clothes are laminated on a mould. These laminated glass fiber clothes are bonded with each other by using an epoxy-based adhesive so that a shape of a ship is obtained.

In these conventional glass fiber reinforced structure, the bundled or bonded state of the multiplicity of glass fiber filaments by the size is unchanged. However, it is the inventor's discovery that the bonded state of the filaments can provide only a limited contact area between the glass fibers and the plastics, thereby reducing bonding force. In other words, a 100% use of the advantages of the fiber reinforced plastic is not attained. The present invention is based on this inventor's discovery. Namely, the present invention aims to obtain an idealized contact between the glass fibers and the plastics as the basic materials. In order to attain this object, a key idea of the present invention is in separating the glass fibers individually by removing the size and the individually separated glass fibers are mixed with a paint as the base plastic material. As a result, a highly increased contact area between the glass fibers and the plastic material is obtained, which results in an idealized reinforcing function by the glass fibers.

According to the first aspect of the present invention, a slurry composition is provided for reinforcing a concrete structure, said slurry composition including a paint and glass fibers suspended in the paint, said glass fibers being of a predetermined length that are cut from glass fiber filaments, said glass fibers to be suspended in the paint being under an individually separated condition without accompanying any residue of size on the surfaces of the glass fibers.

According to the second aspect of the present invention, slurry composition is provided for reinforcing a concrete structure, said slurry composition including a paint and glass fibers suspended in the paint, said glass fibers being of a predetermined length that are cut from glass fiber filaments, said cut glass fibers being the ones from which any residual size on their surfaces are removed by immersing the glass fibers to a solvent.

In the slurry composition, the glass fibers may preferably be the ones that are obtained by cutting the glass fiber strands as a bundle of glass fiber filaments to the predetermined length, while removing from the glass fiber strands a size which are attached to the filaments during execution of its spinning.

In the slurry composition, the cut length of the glass fibers may preferably in a range between 2 to 13 mm.

In the slurry composition, a weight percent of the glass fibers in the slurry may preferably be in a range between 5 to 15%.

In the slurry composition, the paint may preferably be an acrylic elastic paint.

According to the third aspect of the present invention, a method is provided for producing a slurry composition based on a paint for strengthening a concrete structure by applying the paint to a surface of the concrete structure, said method comprising the steps of:

providing chopped glass fiber strands as bundles of glass fiber filaments of a predetermined length;

removing from the cut length of the strands size applied to the strands during the execution of the spinning process in such a manner that glass fibers of the predetermined length which are separated individually from each other are obtained, and;

mixing the glass fibers with the paint for obtaining a slurry, wherein the individually separated glass fibers are suspended in the paint.

In the method, the cut length of the glass fibers may preferably be in a range between 2 to 13 mm.

In the method, a weight percent of the glass fibers in the slurry may preferably be in a range between 5 to 15%.

In the method, the paint may preferably be an acrylic elastic paint.

According to a fourth aspect of the present invention, a method is provided for reinforcing a concrete structure, by applying a slurry to the surface of the concrete structure, comprising the steps of:

providing chopped glass fiber strands as bundles of glass fiber filaments of a predetermined length;

immersing the cut length of the strands to a solvent such as a toluene for removing any residual size applied to the glass fiber filaments during the execution of the spinning process in such a manner that glass fibers of the predetermined length which are separated individually from each other are obtained;

mixing the glass fibers with the paint for obtaining a slurry, wherein the glass fibers are suspended in the paint, and;

applying the slurry to the surface of the concrete structure, thereby obtaining a glass fiber reinforced coating on the surface of the concrete structure.

In the method, said step for applying the slurry may preferably comprise the steps of:

pressurizing the slurry by the pressure of an air, and;

spraying the pressurized slurry to the surface of the concrete.

In the method, said spraying step may preferably comprise the steps of:

providing a nozzle for generating a flow of the slurry directed to a surface of the concrete structure;

creating, as a first stage, a flow of a pressurized air directed to the nozzle, and;

allowing said pressurized slurry to be pushed into the flow of the pressurized air, thereby causing the slurry to be sheared so that an atomized flow of the slurry which is directed to the surface of the concrete structure is obtained.

In the method, a value of said predetermined length may preferably be less than 10 mm.

In the method, said step for applying the slurry may preferably comprise the steps of:

dipping a brash to the slurry, and;

brushing with the brash the surface of the concrete.

In the method, a value of said predetermined length may preferably be larger than 10 mm.

BRIEF EXPLANATION OF ATTACHED DRAWINGS

DESCRIPTION OF PREFERRED EMBODIMENTS

Figure 1:
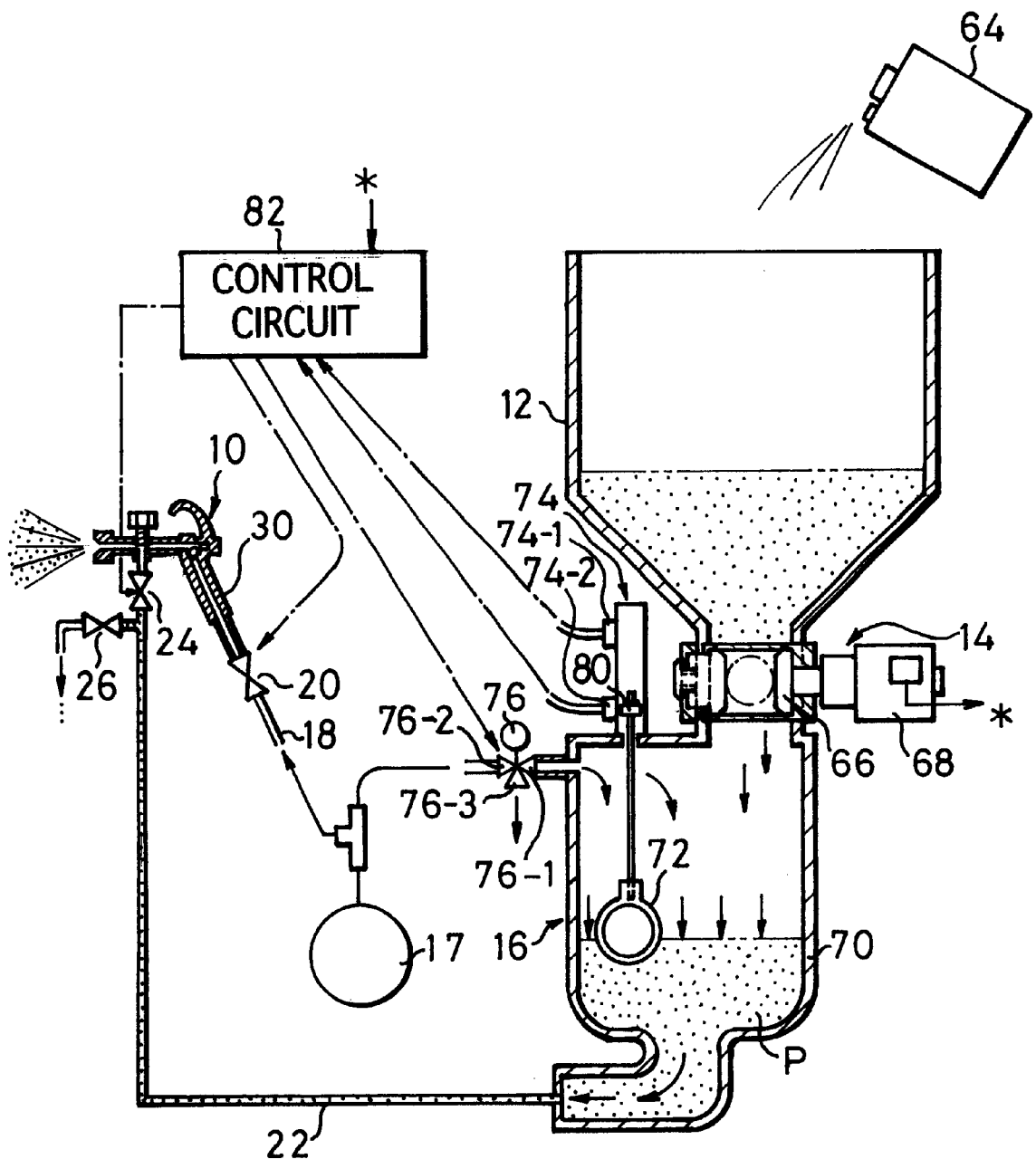
FIG. 1 is a general view of a system for applying a paint suspended by glass fibers according to the present invention to a surface of deteriorated concrete structure.

In a working of the present invention, paint is mixed with glass fibers so that a slurry according to the present invention is obtained. A type of paint, which is preferable for practicing the present invention, is of so-called elastic paint, such as the one including, as a main component, a cross-linked acrylic emulsion. The glass fibers according to the present invention are so-called chopped strands, which are obtained by cutting glass fiber filaments to a predetermined length. Furthermore, from the glass fiber chopped strands, a size as adhesive high polymer such as polyvinyl alcohol or methyl cellulose with various emulsifiers and oil is removed by immersing the chopped strands to an organic solvent such as toluene or styrene. Namely, in a well-known manner, during a spinning of glass fiber filaments, a feeding of the size to the glass fiber filament is done. In other words, the glass fiber filaments (chopped strands) just after the execution of the spinning are under a mutually collected or lumped state due to the existence of the size. As a result of the treatment of the glass fiber chopped strands with the organic solvent such as toluene or styrene, the size is removed, which causes the glass fibers constructing the chopped strands to be individually separated. As well known, the glass fibers has an individual fiber diameter of a value in a range between about 1 $\mu$m to about 20 $\mu$m. Filaments of a number of about several hundreds are combined to a single strand, which is cut to a predetermined length, thereby obtaining chopped strand. In this case, the length of a fiber is in a range between about 1 mm to about 20 mm. Then, a size is removed by immersing the chopped strand to a relevant organic solvent, so that the individual glass fibers are separated from each other. The removal of the size is not necessarily be done by the organic solvent. Namely, as an alternative, a heat treatment is done in a heating oven in such a manner that the size is thermally dissipated. However, for this latter alternative for removal of the size, a relatively complicated system of a large sized is required. Thus, the formally explained method for the removal of the size by the use of a solvent is desirable when a production of small lot products is necessary.

The glass fibers which are individually separated by the removal of the size are mixed with an acrylic paint, so that a slurry is obtained, wherein the glass fibers of predetermined length are suspended in the paint. It is desirable that a ratio of the weight of the glass fibers with respect to that of the paint is in a range between about 1% to about 30%.

In the working of the present invention for repairing a concrete structure, a prime coating is done under a spraying or brushing. After a completion of a drying of the prime coating, a spray or brush coating of the paint suspending with the glass fibers as the reinforcing agent according to the present is done. The inventor has found that an excessively increased length of the glass fibers is not suitable for the spray coating. However, the inventor has found that the glass fibers of a fiber length shorter than 10 mm has a sufficient flexibility which allows the glass fiber to be smoothly passed through a spray nozzle of an inner diameter as small as 1 mm, thereby allowing the paint application operation to be smoothly carried out. When the fiber length is much more longer, an occurrence of a clogging of the spray nozzle is more likely and therefore the brush painting is desirable.

The paint as the cross-linked acrylic emulsion can forms, after the completion of the coating, an elastic coated layer which is strongly adhered to the surface of the concrete structure irrespective of a surface shape of the concrete structure. Furthermore, the coated layer can provide an increased waterproof performance. In addition, a strongly adhered state is obtained between the acrylic paint and the glass fibers. Furthermore, the glass fibers cut from filaments are under condition that they are completely separated from each other by removing the size, so that a highly increased contact area of the glass fibers with respect to the paint is obtained, thereby obtaining a surface coating of a highly increased strength as well as of a prolonged service life. The inventor has found that the strength of the coated layer according to the present invention can be increased to a value of about 450 kg/cm$^2$ or more by a desired value of a mixing ratio, a selection of a kind of the material as well as re-coating.

During an actual working for mending an aged or deteriorated concrete structure, it may be desirable that, prior to the coating with the slurry in which the glass fibers are suspended in acrylic paint according to the present invention, a meshes structure of a glass fiber as a primer can be applied, so that an increased thickness of the coating can be easily obtained. In this case, so-called roving cloth may be used as the mesh. Such a roving cloth is obtained as a coased plain weave fabric from rovings including glass fiber filaments of a number of several hundred, each filament having a thickness of several $\mu$m. Such a roving cloth is the one which is available from some glass fiber manufacturers. Such a roving cloth is typically used as a reinforcing material in various kinds of fiber reinforced plastic (FRP), such as FRP ship. According to the working of the present invention, the roving cloth together with a primer is applied to the surface of the concrete structure to be repaired. Then, a coating of the slurry as an acrylic paint mixed with the individually separated glass fibers according to the present is done by using any suitable means such as spray, roller or brush.

A type of paint, which is preferable from the view of practicing the present invention, is the one which is based on acrylic emulsion type capable of providing an integrated elastic layer from the view point of that this elastic layer can desirably follow the shape of the surface to be coated, has an increased waterproof performance and can be strongly adhered to the glass fibers. However, any other type of paint can be used in the working of the present invention if it can provide an integrated elastic layer that can follow a shape of the surface of the concrete structure to be repaired.

According to the present invention, the paint can be an urethane based anticorrosion paint which is advantageous from the view point for formation of reinforcing layer and for an enhanced waterproof performance.

The above explanation as to an embodiment of the present invention is directed to a repair of aged concrete structure. However, the present invention may be practiced as a different embodiment. Namely, slurry for producing a paper can, for example, be a basic material (matrix) for practicing the present invention. Combined to this slurry is glass fibers cut from filaments, which are under individually separated condition by removing the size as lubricant which is applied to the filaments during the execution of the spinning of the glass fiber filaments, thereby producing a suspension wherein glass fibers are suspended in the slurry for producing a paper. The slurry is subjected to a paper producing process, so that a glass fiber reinforced paper is obtained.

The idea of the present invention is also realized in a molding of a reinforced product. In this case, a basic material (matrix) according to the present invention is pellets made of high polymer. As similar to the previous embodiments, glass fibers under individually separated condition are obtained by deleting size (spinning lubricant) from glass filaments cut to a predetermined length. These individually separated glass fibers are combined with the high polymer pellets, so that a composition according to the present invention as the high polymer mixed with the glass fibers is obtained. In the similar way as the molding a product from high polymer pellets, the composition according to the present invention is introduced into a molding machine, in which the pellets together with the glass fibers are molten and are extruded from an extruder into a mold. Then the molten material is cooled and solidified, which allows a molded reinforced product to be taken out from the mold. In this case, the glass fibers are, under individually separated condition, contacted with the plastic material (matrix material), so that a highly increased value of contact area is obtained, thereby increasing the strength of the reinforced product as a composition.

FIG. 1 illustrates a system for effecting a spray painting, which includes a gun 10, a hopper 12 for holding a paint including glass fibers as explained above, a feed control valve 14 for controlling the supply of the paint, a device 16 for pressurizing the paint, a device 17 for generating an air flow under a pressure such as a compressor, an air feed pipe 18 for directing the air from the device 17 to the gun 10, a feed pipe 22 for feeding the paint including glass fibers from the paint pressurizing device 16 to the gun 10, a paint control valve 24 arranged on the pipe 22 for controlling the feed of the slurry (paint including glass fibers) to the spray painting gun 10 and a drain control valve 26 for the paint.

Figure 2:
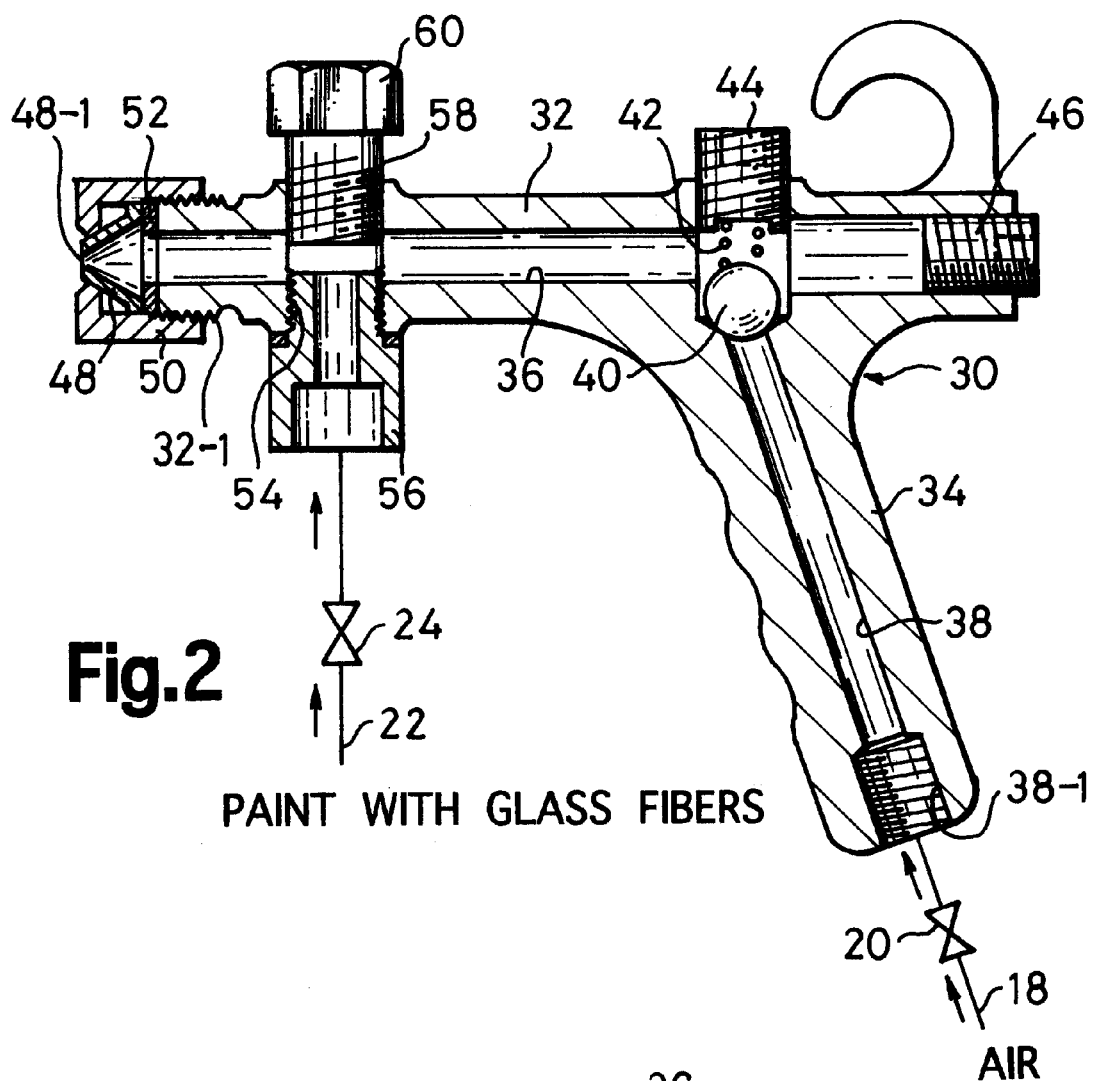
FIG. 2 is a cross-sectional view of a spray painting gun in FIG. 1.

As shown in detail in FIG. 2, the spray-painting gun 10 includes a body 30 of a pistol shape made as a cast from a steel or aluminum, which has a barrel portion 32 and a grip portion 34. The barrel portion 32 is formed with a first bore 36 extending completely along the length of the portion 34. The grip portion 34 is formed with a second bore 38, which is opened obliquely to the first bore 36. The second bore 38 is, at its end, formed with a screw threaded portion 38-1, which functions as a connecting part to the air feed pipe 18 in FIG. 1. A check valve 40 as a ball shape is arranged at a location of the second bore 38 where the latter is opened to the first bore 36. A spring 42 urges the ball shaped valve 40 so as to take a normally closed position. A set screw 44 is arranged for controlling a set pressure of the spring 42, so that a pressure is controlled for causing the check valve 40 to be opened.

At the end of the first bore 36 adjacent to the grip portion 34, a blind screw 46 is provided. The blind screw 46 is normally under a tightened condition. However, the screw 46 can be unscrewed and removed when a cleaning of the gun is necessary. At the end opposite the blind screw 46, the first bore 36 is provided with a nozzle 48. The nozzle 48 is generally formed with a cone having a narrowed end as a nozzle hole 48-1, which is for an injection of the paint with the individually separated glass fibers. A tubular shaped nut 50 is screwed to a screw thread portion 32-1 at the end of the barrel portion 32 of the body 30, so that the nozzle 48 is via a seal 52 pressed to the end of the barrel 32, thereby tightening the nozzle 48 to the body 30.

The barrel portion 32 is formed with a screw threaded bore 54, which is opened laterally to the straight bore 36 of the barrel portion 32 and to which a union 56 is screwed. The union 56 is for connection with the pipe 22 for the paint in which the glass fibers are suspended. The union 56 has an inner end, which is slightly projected from the inner peripheral surface of the straight shaped bore 36 in such a manner that a venturi is created, where a flow area is throttled. Opposite the union 56, a bore 58 with a screw thread is formed, to which a gap adjusting member 60 is screwed, which allows the gap to be adjusted between the union 56 and the member 60. In accordance with the degree of the throttling of the gap, an effective air flow area is adjusted. In other words, the adjustment of the member 60 is such that a desired amount of the air passed through the gap is obtained.

In FIG. 1, the hopper 12 has a tapered bottom portion and is charged, from a container 64, by the paint with the glass fibers according to the present invention.

The control valve 14 is arranged at the bottom of the hopper 12 and is provided with a rotary valve 66 which is rotated between a closed position and an opened position and an electric driving motor 68 for the rotary valve 66. When a closing signal is received by the electric driving motor 68, the valve member 66 is moved to the closed position, by which the feed of the paint from the hopper 12 to the pressurizing device 70 is stopped. Contrary to this, when an opening signal is received by the electric driving motor 68, the valve member 66 is rotated to the opened position, by which the feed of the paint from the hopper 12 to the pressurizing device 70 is commenced.

The paint pressurizing device 16 includes a paint tank 70, a float 72, a float position sensing device 74 and a three way switching valve 76. The three way switching valve 76 includes a common port 76-1 in connection with the tank 70, a first switching port 76-2 in connection with the compressor 17 and a second switching port 76-3 opened to the atmosphere.

The float position sensing device 74 includes a reed switch 74-1 for detecting an upper position of the float 72 and a reed switch 74-2 for detecting a lower position of the float 72. The float 72 has an end extending out of the tank 70, to which end a permanent magnet member 80 is fixed.

The control circuit 82 is in an electrical connection with the drive motor 68 of the feed control valve 14, the three way switching valve 76, the high position detecting reed switch 74-1 and the low position detecting reed switch 74-2. The control circuit 82 functions to effect an automatic supply of the paint to the tank 70. The control circuit 82 is further connected with the air valve 20 and the valve 24. An automatic control of these valves 20 and 24 is done by feeding control signals from the unit 82 to the valves 20 and 24. However, a manual control of the valves 20 and 24 is within the scope of the present invention.

Now, an operation of the control circuit 82 for filling the paint into the tank 70 will be explained. A closure signal from the control circuit 82 to the drive motor 68 of the feed control valve 14 causes the valve member 6 to be moved to the closed position. Simultaneously, a signal from the control circuit 82 is supplied to the three way valve 76 for causing the latter to be situated to a position where the common port 76-1 is connected to the first switching port 76-2. As a result, the pressure of the compressor 17 is opened to the level of the paint P in the tank 70, so that the paint P is pressurized, so that the pressurized paint is forced to be fed to the paint spray gun 10 via the pipe 22. A continuation of an application of the paint by the gun 10 causes the paint level to be lowered in the tank 70. When the paint level is lowered to the bottom limit, the magnet 80 is faced with the bottom position detecting reed switch 74-2, so that the switch 74-2 is made ON. The ON condition of the reed switch 74-2 causes a signal to be generated, which is, from the control unit 82, transmitted to the three way switching valve 76, so that the latter is switched to the position, where the common port 76-1 is connected to the second switching port 76-3, which causes the atmospheric pressure to be opened to the space above the level of the paint in the tank 70. Simultaneously or under a slight delay with respect to the switching operation of the three way switching valve 76, the control circuit 82 issues a signal, by which the electric drive motor 68 of the feed control valve 14 is switched to an open condition, which allows the paint in the hopper 12 to be dropped to the tank 70. As a result, a raise in the paint level in the paint tank 70 is instantly occurred. The continuous raise in the paint level finally causes the magnet 80 to be faced with the high position detecting reed switch 74-1, which causes the latter to be made ON. The ON condition of the reed switch 74-1 causes a signal to be generated, which is, from the control unit 82, transmitted to the three way switching valve 76, so that the latter is switched to the position, where the common port 76-1 is connected to the first switching port 76-2, which causes the compressor 17 to be connected to the space above the level of the paint in the tank 70. Simultaneously or under a slight delay with respect to the switching operation of the three way switching valve 76, the control circuit 82 issues a signal, by which the electric drive motor 68 of the feed control valve 14 is switched to a closed condition. As a result, the tank 70 is disconnected from the hopper 12 and the high pressure of the compressor 17 is opened to the space above the paint level in the tank 70. Thus, a feed of the paint from the tank 70 to the spray painting gun 10 is restarted.

Next, an operation of the gun 10 for applying the paint will be explained. At a first stage of a paint application operation, the air valve 20 is opened by a manual operation or by an electric signal from the control circuit 82, so that the pressurized air from the compressor 17 is, via the air feed pipe 18, introduced into the second bore 38 of the spray paint gun 10. The pressure of the air causes the check valve 40 to be opened, so that the airflow is introduced into the straight bore 36. As a result, a high-speed airflow is created at the adjustable gap between the union 56 and the adjusting screw 60. Under the state where a high speed air flow is created at the adjustable gap between the union 56 and the adjusting screw 60, the paint flow control valve 24 is opened by a manual operation or an electric signal from the control circuit 82, so that the paint suspended with the glass fibers are forced or pushed laterally into the high speed flow of the air from the union 56. Such a laterally forced flow of the paint is subjected to a shearing operation by the air flow under high speed at the adjustable gap between the union 56 and the screw 60, so that the paint is broken into an atomized condition, is blown into the nozzle 48 and is, from the nozzle hole 48-1, applied to the objected to be treated.

Figure 3:
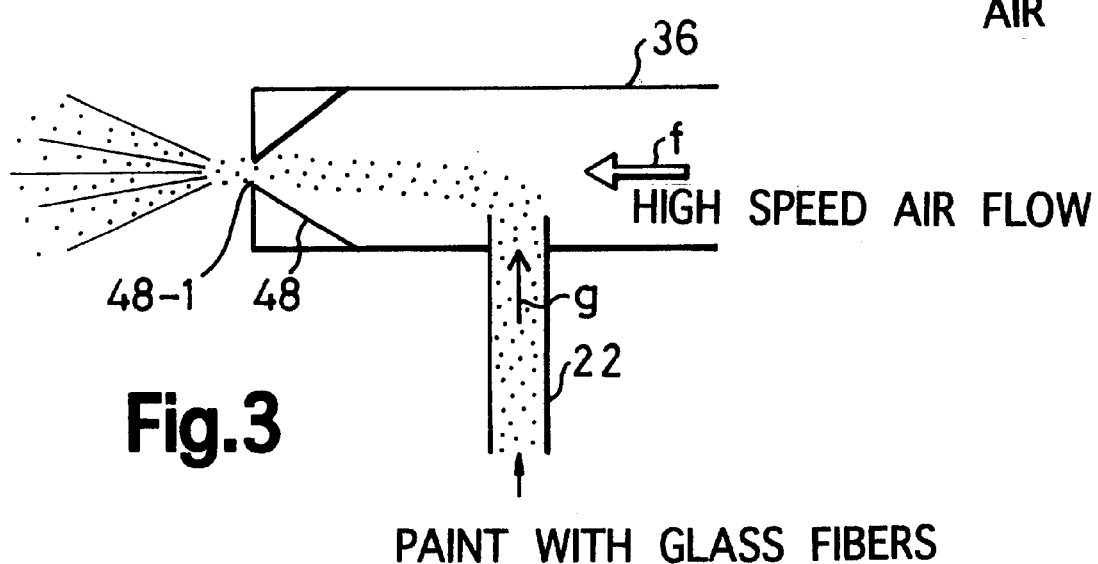
FIG. 3 is a schematic view illustrating a spraying function of the paint with the paint according to the present invention.

FIG. 3 illustrates schematically how the application of the paint by the spray painting gun 10 is carried out. In the operation, the airflow f is, as the first stage, created in the bore 36. Then, as the second stage, the paint with the glass fibers are, as shown by an arrow g, pushed into the high speed air flow, so that the paint is broken into an atomized condition under the shearing force by the air flow f and is blown to the nozzle 48, i.e., the nozzle hole 48-1. As a result, the glass fibers included in the paint are discharged from the nozzle 48 and, in other words, are prevented from being stayed in the nozzle. As a result, the nozzle 48 is effectively prevented from being clogged by the glass fibers, thereby allowing the application operation to be practiced steadily for a prolonged time.

In the working of the present invention, the pressure in the tank 70 is, preferably, of a value of 7 kg/cm². The pressure in the pipe 22 is preferably in a range between 10 to 14 kg/cm², which allows the paint to be fed in the hose of a length as long as several meters.

As for the pressurizing device 16, in place of the pressure tank type as shown in FIG. 1, a diaphragm type pump or a screw pump as cylinder pump type can be used.

EXAMPLE 1

Chopped strands available in the trade name SMC from NITTO BOSEKI Co., Ltd. at 1-2-1, Hama-cho, Nipponbashi, Chyuo-ku Tokyo-to, Japan, were prepared. The chopped strands are the ones, which are obtained by spinning a plurality of glass filaments of a number of 400, each having a thickness of 10 $\mu$m, while a size based on polyvinyl alcohol is applied to the filaments being spun and by subjecting the glass fiber filaments to a cutting at a predetermined cut length. Three types of cutting length of 2 mm, 6 mm and 13 mm were prepared. The chopped strands were, then, immersed first to a toluene as a solvent, so that the size was solved to the solvent and second to an alcohol for removing the solvent. As a result, flakes of cut glass fibers of a filament thickness of 10 $\mu$m, which are completely separated from each other, were obtained for three kinds of fiber length of 2 mm (sample A), the length of 6 mm (sample B) and the length of 13 mm (sample C).

As a comparative example (sample D), chopped strand of the length of 13 mm (sample D: SMC from NITTO BOSEKI Co., Ltd) were prepared, which are the ones produced, first, by spinning glass fiber filaments of a number of 400, each of which has a thickness of 10 $\mu$m, while the size is applied and, then, by cutting the filaments to the length of 13 mm. Unlike to the samples A to C, the removal of the size in the sample D was not done. In other words, the sample D is the chopped strand as is.

The glass fiber assemblies (flakes) as the samples A to C and the chopped strands without removing the size as the sample D were respectively mixed with an electric paint based on based on acrylic emulsion under a trade name of Non-Top Elasticity available from HIGASHI NIPPON TORYO Co. Ltd. at 2-25-18 Horikiri, Katsushika-ku, Tokyo-to, Japan, so that slurries were obtained where the glass fibers are suspended in the paint. For each of samples, three kinds of mixing ratio (weight ratio), that are 5%, 10% and 25 %, were prepared.

Furthermore, a sample (sample E) purely constructed by the paint, i.e., without glass fibers, was also prepared.

Then, a primer is applied to a surface of a deteriorated concrete structure. The primer is the one which is available from the above mentioned HIGASHI NIPPON Paint Co. Ltd. so that it is used together with the elastic paint of the trade name of Non-Top Elasticity. The primer is a particular kind of resin under a liquid state and is used for increasing an adherence of the paint to the surface to be treated.

After the completion of the application of the primer, an application of the slurries as obtained above was done by using the system as explained with reference to FIGS. 1 to 3. The diameter of the nozzle hole 48-1 of the gun 10 in FIGS. 1 and 2 was 2 mm, and the discharging pressure was 80 kg/cm The slurry as applied was, then, subjected to a drying and a coating of a thickness of 1 mm was obtained on the surface of the concrete structure.

Test pieces of coatings of a thickness of 1 mm and of width of 100 mm were prepared for each of samples A to D, for each of which samples three different values of the weight ratio of glass fibers, that are 5%, 10% and 15% were prepared. A tensile strength of these test pieces are measured by using a tensile tester. A measurement of a tensile strength was similarly done for the sample E with no glass fiber. The result of the tests is shown in the following table. In the table 1, the unit is kg/100 mm²

TABLE 1

| | Samples (Fiber length) | | | | |
|---|---|---|---|---|---|
| Mixing Ratio | A (2 mm) | B (6 mm) | C (13 mm) | D (13 mm) | E (paint only) |
| 0% | — | — | — | — | 4.5 |
| 5% | 139.7 | 153.2 | 158.1 | 18.8 | — |
| 10% | 297.6 | 311.3 | 322.0 | 28.4 | — |
| 15% | 437.6 | 454.5 | 459.0 | 40.5 | — |

From the above table, it will be clear that, the coating obtained by the slurry in the sample D where the chopped strands from the glass fiber filaments without removing the size are merely mixed with the paint can obtain only 4 to 10 time increase in the tensile strength over the coating obtained by the paint only (sample E).

Figure 4:
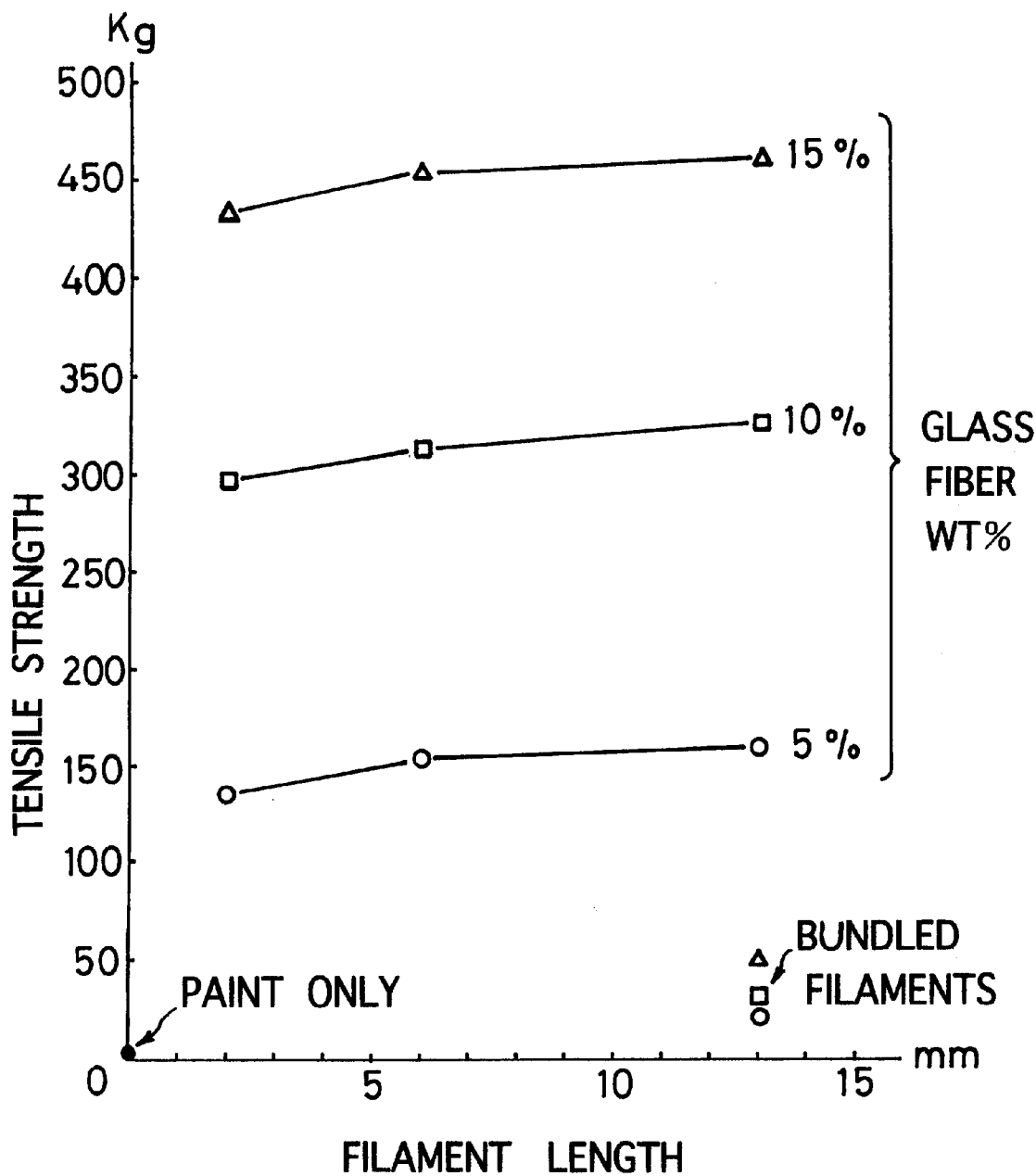
FIG. 4 is graphs illustrating relationships between filament length and a tensile strength of a coating as obtained by the slurry composition according to the present invention.

Contrary to this, the above table shows that the coating obtained by the slurry in the samples A to C where the individually separated glass fibers by the removal of the size are mixed with the paint can obtain 30 to 100 time increase in the tensile strength over the coating obtained by the paint only (sample E) . Thus, the application of the slurry according to the present invention to a deteriorated concrete structure can provide a highly reinforced coating on a surface of the deteriorated concrete structure. FIG. 4 is a graphical illustration of the table. Namely, in FIG. 4, abscissa is a cut length of the filament, while ordinate is tensile strength in term of kg/100 cm². In FIG. 4, lines show relationships between the filament length and the tensile strength for various values of mixing ratio as designated.

It was the inventor's finding that the coating according to the present invention can provide an aesthetic appearance as well as a highly increased waterproof capacity.

EXAMPLE 2

Slurries (paint with glass fibers) for reinforcing a concrete structure are prepared in the similar way as in the example 1.

In the similar way as in the example 1, deteriorated parts on the concrete structure to be repaired are removed. Then, the primer is coated on the concrete structure, while a roving cloth is applied to the surface of the concrete structure. The roving cloth is the one, which is available from NITTO BOSEKI Co., Ltd in the trade name of RH. Then, as similar to the example 1, the slurries are applied to the surface of the concrete structure by using an applicator roller and the dried, thereby obtaining a reinforcing coating on the concrete structure.

In this example 2, any removal process for removing the size in the roving cloth was not practiced. Thus, the strength of the coating as obtained on the concrete structure is reduced in comparison with the example 1. However, an increase thickness of the coating can easily be obtained due to the use of the roving cloth as well as an application of the paint by using the applicator roller.

What is claimed is:

1. A slurry composition for reinforcing a concrete structure, including a paint and glass fibers suspended in the paint, said glass fibers being of a predetermined length that are cut from glass fiber filaments, said glass fibers to be suspended in the paint being under an individually separated condition without accompanying any residue of size on the surfaces of the glass fibers.

2. A slurry composition for reinforcing a concrete structure, including a paint and glass fibers suspended in the paint, said glass fibers being of a predetermined length that are cut from glass fiber filaments, said cut glass fibers being the ones from which any residual size on their surfaces are removed by immersing the glass fibers to a solvent.

3. A slurry composition according to claim 1, wherein the cut length of the glass fibers is in a range between 2 to 13 mm.

4. A slurry composition according to claim 1, wherein a weight percent of the glass fibers in the slurry is in a range between 5 to 15%.

5. A slurry composition according to claim 1, wherein the paint is an acrylic elastic paint.

6. A method for producing a slurry composition based on a paint for strengthening a concrete structure by applying the paint to a surface of the concrete structure, comprising the steps of:
   providing chopped glass fiber strands as bundles of glass fiber filaments of a predetermined length;
   removing from the cut length of the strands size applied to the strands during the execution of the spinning process in such a manner that glass fibers of the predetermined length which are separated individually from each other are obtained, and;
   mixing the individually separated glass fibers with the paint for obtaining a slurry, wherein the glass fibers are suspended in the paint.

7. A method according to claim 6, wherein said removing comprises step of immersing the cut length of the strands to a solvent so that any size on the surface of the strands is dissolved.

8. A method according to claim 6, wherein the cut length of the glass fibers is in a range between 2 to 13 mm.

9. A slurry composition according to claim 6, wherein a weight percent of the glass fibers in the slurry is in a range between 5 to 15%.

10. A slurry composition according to claim 6, wherein the paint is an acrylic elastic paint.

11. A method for reinforcing a concrete structure, by applying a slurry to the surface of the concrete structure, comprising the steps of:
    providing chopped glass fiber strands as bundles of glass fiber filaments of a predetermined length;
    immersing the cut length of the strands to a solvent for removing any residual size applied to the glass fiber filaments during the execution of the spinning process in such a manner that glass fibers of the predetermined length which are separated individually from each other are obtained;
    mixing the glass fibers with the paint for obtaining a slurry, wherein the glass fibers are suspended in the paint, and;
    applying the slurry to the surface of the concrete structure, thereby obtaining a glass fiber reinforced coating on the surface of the concrete structure.

12. A method according to claim 11, wherein said step for applying the slurry comprises the steps of:
    pressurizing the slurry by the pressure of an air, and;
    spraying the pressurized slurry to the surface of the concrete.

13. A method according to claim 12, wherein said spraying step comprises the steps of:
    providing a nozzle for generating a flow of the slurry directed to a surface of the concrete structure;
    creating, as a first stage, a flow of a pressurized air directed to the nozzle, and;
    allowing said pressurized slurry to be pushed into the flow of the pressurized air, thereby causing the slurry to be sheared so that an atomized flow of the slurry which is directed to the surface of the concrete structure is obtained.

14. A method according to claim 12, wherein a value of said predetermined length is less than 10 mm.

15. A method according to claim 11, wherein said step for applying the slurry comprises the steps of:
    dipping a brash to the slurry, and;
    brushing with the brash the surface of the concrete.

16. A method according to claim 13, wherein a value of said predetermined length is larger than 10 mm.

* * * * *

UNITED STATES PATENT AND TRADEMARK OFFICE
CERTIFICATE OF CORRECTION

PATENT NO.      : 6,294,605 B1
DATED           : September 25, 2001
INVENTOR(S)     : Suzuki et al.

It is certified that error appears in the above-identified patent and that said Letters Patent is hereby corrected as shown below:

<u>Title page,</u>
Item [30], Foreign Application Priority information should read:
-- [30]         Foreign Application Priority Data
 Sep. 28, 1999   (JP) ………………………….. 11-273833
 Mar. 13, 2000   (JP) ………………………….. 12-067890 --

Signed and Sealed this

Tenth Day of December, 2002

JAMES E. ROGAN
*Director of the United States Patent and Trademark Office*